(12) United States Patent
Williams, Jr. et al.

(10) Patent No.: US 7,613,200 B1
(45) Date of Patent: Nov. 3, 2009

(54) METHOD AND APPARATUS USING A RANDOM INDICATION TO MAP ITEMS TO PATHS AND TO RECIRCULATE OR DELAY THE SENDING OF A PARTICULAR ITEM WHEN A DESTINATION OVER ITS MAPPED PATH IS UNREACHABLE

(75) Inventors: John J. Williams, Jr., Pleasanton, CA (US); Thomas Dejanovic, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1491 days.

(21) Appl. No.: 10/051,728

(22) Filed: Jan. 15, 2002

(51) Int. Cl.
*H04L 12/54* (2006.01)
(52) U.S. Cl. .................... 370/414; 370/429
(58) Field of Classification Search ............ 370/429, 370/412, 414; 714/748, 749
See application file for complete search history.

(56) References Cited

U.S. PATENT DOCUMENTS

| | | | |
|---|---|---|---|
| 4,491,945 A | | 1/1985 | Turner |
| 4,494,230 A | | 1/1985 | Turner |
| 4,630,260 A | | 12/1986 | Toy et al. |
| 4,734,907 A | | 3/1988 | Turner |
| 4,829,227 A | | 5/1989 | Turner |
| 4,849,968 A | | 7/1989 | Turner |
| 4,866,701 A | * | 9/1989 | Giacopelli et al. .......... 370/411 |
| 4,893,304 A | * | 1/1990 | Giacopelli et al. .......... 370/411 |
| 4,901,309 A | | 2/1990 | Turner |
| 4,967,345 A | * | 10/1990 | Clarke et al. ................ 709/241 |
| 5,127,000 A | | 6/1992 | Henrion |
| 5,173,897 A | | 12/1992 | Schrodi et al. |
| 5,179,551 A | | 1/1993 | Turner |
| 5,179,556 A | | 1/1993 | Turner |
| 5,229,991 A | | 7/1993 | Turner |
| 5,253,251 A | | 10/1993 | Aramaki |
| 5,260,935 A | | 11/1993 | Turner |
| 5,339,311 A | | 8/1994 | Turner |
| 5,367,520 A | * | 11/1994 | Cordell .................. 370/395.71 |

(Continued)

OTHER PUBLICATIONS

Jonathan S. Turner, "An Optimal Nonblocking Multicast Virtual Circuit Switch," Jun. 1994, Proceedings of Infocom, 8 pages.

(Continued)

*Primary Examiner*—Jason E Mattis
(74) *Attorney, Agent, or Firm*—The Law Office of Kirk D. Williams

(57) ABSTRACT

Methods and apparatus are disclosed using a random indication to map items to paths and to recirculate or delay the sending of a particular item when a destination over its mapped path is unreachable, including, but not limited to the context of sending of packets across multiple paths in a packet switching system. In one implementation, a set of items is buffered, with the set of items including a first and second sets of items. The items in the first set of items are forwarded over a set of paths in a first configuration. The set of paths is reconfigured into a second configuration, and the items in the second set of items are forwarded over the set of paths in the second configuration. In one implementation, a recirculation buffer is used to hold items not immediately sent. In one implementation, the paths are reconfigured in a random fashion.

17 Claims, 6 Drawing Sheets

U.S. PATENT DOCUMENTS

| | | |
|---|---|---|
| 5,402,415 A | 3/1995 | Turner |
| 5,416,769 A * | 5/1995 | Karol .......................... 370/414 |
| 5,440,553 A * | 8/1995 | Widjaja et al. .............. 370/411 |
| 5,544,160 A * | 8/1996 | Cloonan et al. .......... 370/395.1 |
| 5,636,210 A * | 6/1997 | Agrawal ..................... 370/390 |
| 5,842,040 A | 11/1998 | Hughes et al. |
| 5,856,977 A * | 1/1999 | Yang et al. ............. 370/395.72 |
| 6,735,203 B1 * | 5/2004 | Heiman ...................... 370/394 |
| 6,826,186 B1 * | 11/2004 | Dittia et al. ............ 370/395.31 |

OTHER PUBLICATIONS

Chaney et al., "Design of a Gigabit ATM Switch," Feb. 5, 1996, WUCS-96-07, Washington University, St. Louis, MO, 20 pages.

Turner et al., "System Architecture Document for Gigabit Switching Technology," Aug. 27, 1998, Ver. 3.5, ARL-94-11, Washington University, St. Louis, MO, 110 pages.

* cited by examiner

METHOD AND APPARATUS USING A RANDOM INDICATION TO MAP ITEMS TO PATHS AND TO RECIRCULATE OR DELAY THE SENDING OF A PARTICULAR ITEM WHEN A DESTINATION OVER ITS MAPPED PATH IS UNREACHABLE

FIELD OF THE INVENTION

This invention especially relates to routing and distribution of items across multiple paths to their respective destinations, such as in communications and computer systems and networks; and more particularly, the invention relates to using a random indication to map items to paths and to recirculate or delay the sending of a particular item when a destination over its mapped path is unreachable, including, but not limited to the context of sending of packets across multiple paths in a packet switching system.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

A network device, such as a switch or router, typically receives, processes, and forwards or discards packets. The performance and traffic congestion management of a switching fabric typically depends greatly upon load balancing per destination among paths through the fabric. The distribution of packets is complicated by the fact that particular destinations may not have all paths available for routing cells. Moreover, it is typically desirable to use a simple distribution scheme and to avoid extensive route determination processing and collection and storage of an extensive set of information.

Especially when a simple deterministic distribution method (e.g., round robin) is used, the traffic generated may not be balanced across all links. Rather, for example, a next location might receive more than its share of packets generated for a particular destination. For example, a round-robin distribution scheme may be used with a check made to see if a destination is reachable over a particular link, and if the destination of a packet is not reachable over a particular link, the packet is typically sent over the next link identified by the distribution scheme. Thus, that next link will typically get more than its desired share of traffic for a particular destination (e.g., its share plus the previous link's share.) Thus, an undesirable traffic pattern may be generated which may impact the performance of a packet switching system. It is desirable for a simple way for maintaining even uniform distribution per destination, even under conditions where faults may make some paths unavailable for some destinations. Needed are new methods and apparatus for routing and distribution of items across multiple paths to their respective destinations.

SUMMARY OF THE INVENTION

Methods and apparatus are disclosed using a random indication to map items to paths and to recirculate or delay the sending of a particular item when a destination over its mapped path is unreachable, including, but not limited to the context of sending of packets across multiple paths in a packet switching system. In one embodiment, a set of items is buffered, with the set of items including a first set of items and a second set of items. The items in the first set of items are forwarded over a set of paths in a first configuration. The set of paths is reconfigured into a second configuration, and one or more items in the second set of items are forwarded over the set of paths in the second configuration. In one embodiment, a recirculation buffer is used to hold items not sent in a particular round (e.g., packet time), while in one embodiment, these items remain in an output buffer. In one embodiment, the set of paths are reconfigured in a random fashion.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1:
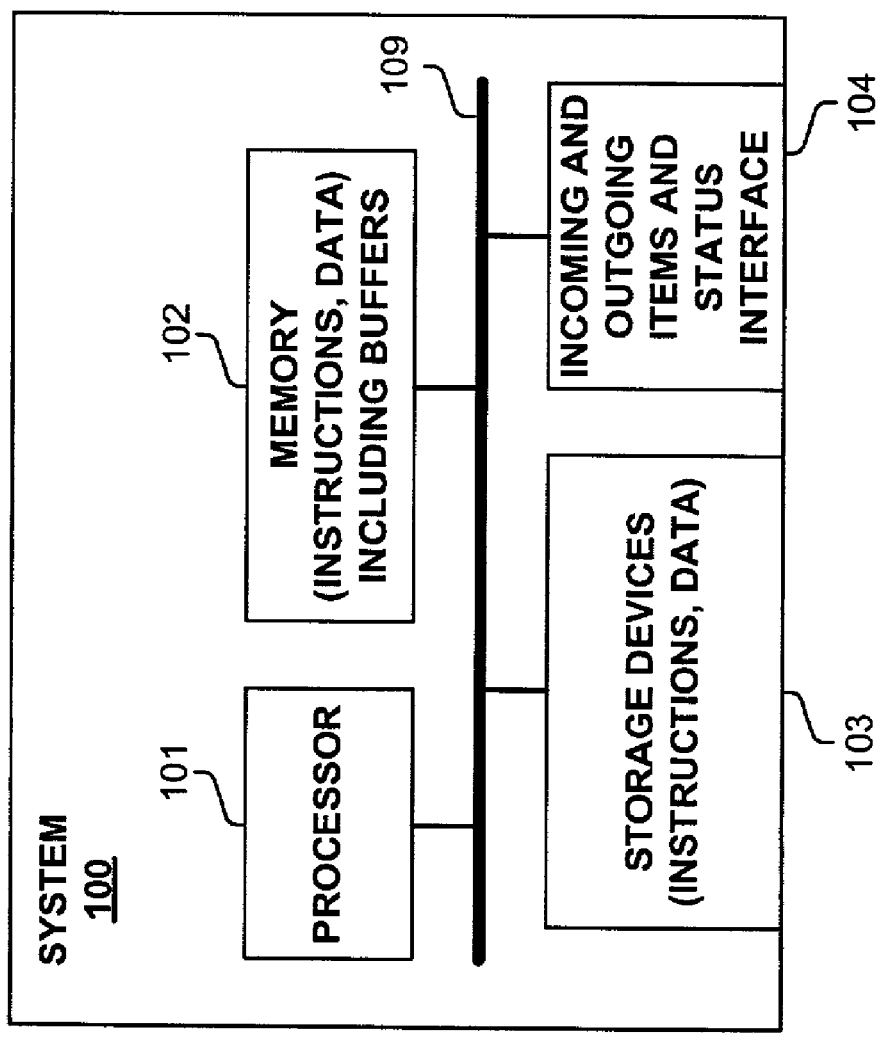
FIG. 1 is a block diagram of a system used in one embodiment using a random indication to map items to paths, and to recirculate or delay the sending of a particular item when a destination over its mapped path is unreachable.

Methods and apparatus are disclosed using a random indication to map items to paths and to recirculate or delay the sending of a particular item when a destination over its mapped path is unreachable, including, but not limited to the context of sending of packets across multiple paths in a packet switching system. Embodiments described herein include various elements and limitations, with no one element or limitation contemplated as being a critical element or limitation. Each of the claims individually recite an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or identification of a packet. Moreover, these packets may contain one or more types of information, including, but not limited to, voice, data, video, and audio information. The term "item" is used herein to refer to a packet or any other unit or piece of information or data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processors and systems, control logic, ASICs, chips, workstations, mainframes, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to the block and flow diagrams, are typically performed in a different serial or parallel ordering and/or by different components and/or over different connections in various embodiments in keeping within the scope and spirit of the invention.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc.

The term "storage mechanism" includes any type of memory, storage device or other mechanism for maintaining instructions or data in any format. "Computer-readable medium" is an extensible term including any memory, storage device, storage mechanism, and other storage mechanisms. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed a processor and/or control logic, and data which is manipulated a processor and/or control logic. The term "data structure" is an extensible term referring to any data structure, data base, and/or one or more or an organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism.

The terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units. Moreover, the phrase "based on x" is used to indicate a minimum set of items x from which something is derived, wherein "x" is extensible and does not necessarily describe a complete list of items on which the operation is based. Additionally, the phrase "coupled to" is used to indicate some level of direct or indirect connection between two elements or devices, with the coupling device or devices modify or not modifying the coupled signal or communicated information. The term "subset" is used to indicate a group of all, less than all, or none of the elements of a set. Moreover, the term "or" is used herein to identify an alternative selection of one or more, including all, of the conjunctive items.

Methods and apparatus are disclosed using a random indication to map items to paths and to recirculate or delay the sending of a particular item when a destination over its mapped path is unreachable, including, but not limited to the context of sending of packets across multiple paths in a packet switching system. In one embodiment, a set of items is buffered, with the set of items including a first set of items and a second set of items. The items in the first set of items are forwarded over a set of paths in a first configuration. The set of paths is reconfigured into a second configuration, and one or more items in the second set of items are forwarded over the set of paths in the second configuration. In one embodiment, a recirculation buffer is used to hold items not sent in a particular round, while in one embodiment, these items remain in an output buffer. In one embodiment, the set of paths are reconfigured in a random fashion.

In one embodiment, a recirculation buffer is used to retry packets that cannot be scheduled due to plane unavailability. Every packet time, a number of packets are attempted to be scheduled after a starting link has been selected at random, and subsequent packets typically are placed in a deterministic manner in each of the paths from the starting path during a particular packet time. Every packet gets one opportunity to be scheduled to a particular link or path. If that packet can not be scheduled, it is put in a recirculation buffer and is retried next packet time by including it in the group of packets to be attempted next packet time. This typically keeps the distribution uniform by randomizing the link or path that is attempted for any particular packet.

FIG. 1 illustrates one embodiment of a system 100 such as, but not limited to a computer or communications system, using a random indication to map items to paths and to recirculate or delay the sending of a particular item when a destination over its mapped path is unreachable, including, but not limited to the context of sending of packets across multiple paths in a packet switching system. In one embodiment, system 100 internally generates the set of items to be sent. In one embodiment, system 100 receives externally generated sets of items over interface 104. In one embodiment, system 100 receives status information over interface 104. In one embodiment, system 100 stores status information and/or packets in memory 102 and/or storage devices 103.

In one embodiment, system 100 includes a processor 101, memory 102, storage devices 103, and optionally incoming and outgoing items and status interface 104, which are typically coupled via one or more communications mechanisms 109 (shown as a bus for illustrative purposes). Various embodiments of system 100 may include more or less elements. The operation of system 100 is typically controlled by processor 101 using memory 102 and storage devices 103 to generate a random indication and to map items to paths and to recirculate or delay the sending of a particular item when a destination over its mapped path is unreachable. Memory 102 is one type of computer-readable medium, and typically comprises random access memory (RAM), read only memory (ROM), flash memory, integrated circuits, and/or other memory components. Memory 102 typically stores computer-executable instructions to be executed by processor 101 and/or data which is manipulated by processor 101 for implementing functionality in accordance with the invention. Storage devices 103 are another type of computer-readable medium, and typically comprise solid state storage media, disk drives, diskettes, networked services, tape drives, and other storage devices. Storage devices 103 typically store computer-executable instructions to be executed by processor 101 and/or data which is manipulated by processor 101 for implementing functionality in accordance with the invention.

As used herein and contemplated by the invention, computer-readable medium is not limited to memory and storage devices; rather computer-readable medium is an extensible term including memory, storage device, and/or other storage mechanism.

Figure 2:
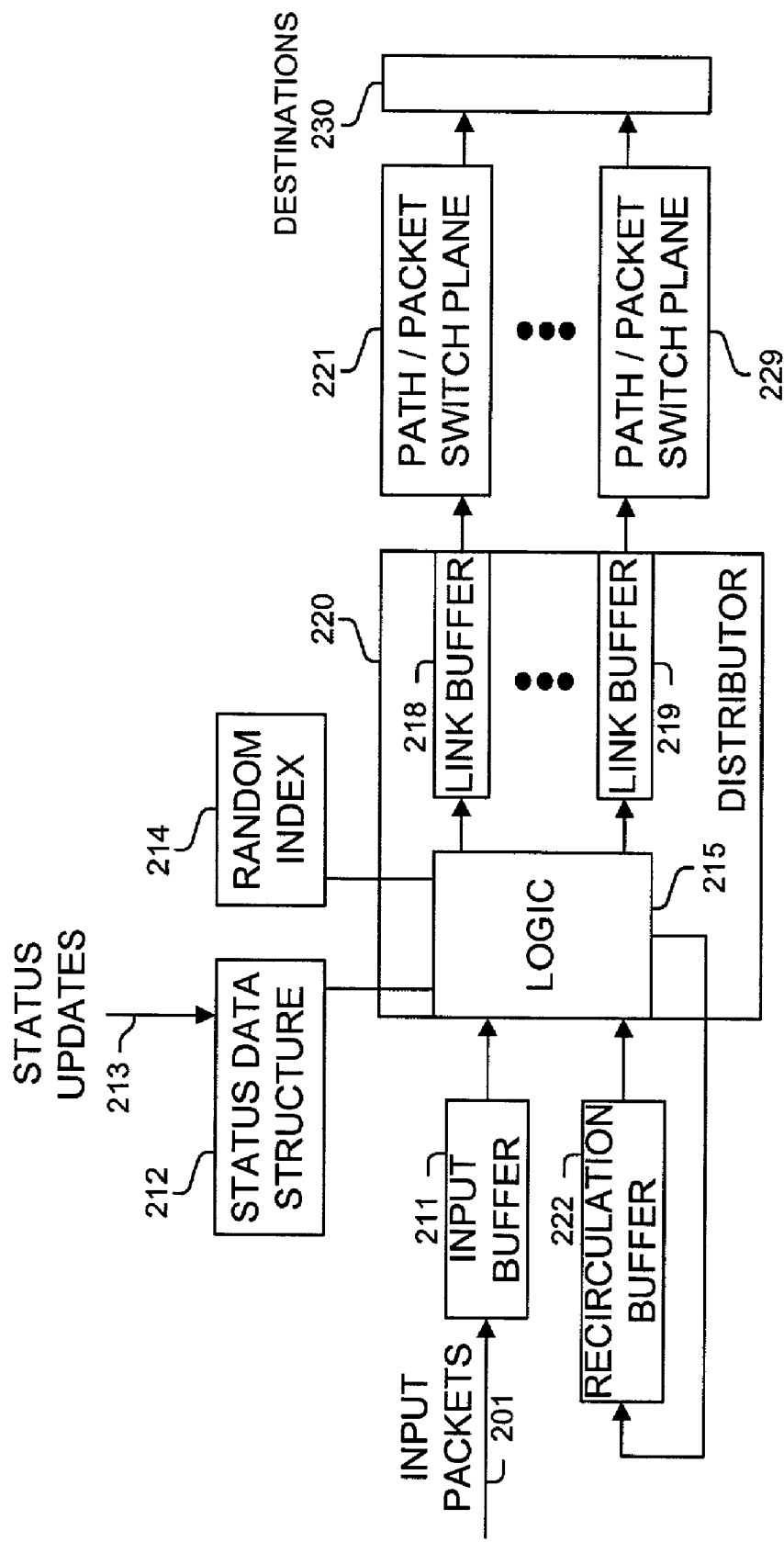
FIG. 2 is a block diagram of a system used in one embodiment using a random indication to map items to paths, and to recirculate or delay the sending of a particular item when a destination over its mapped path is unreachable.
Figure 4:
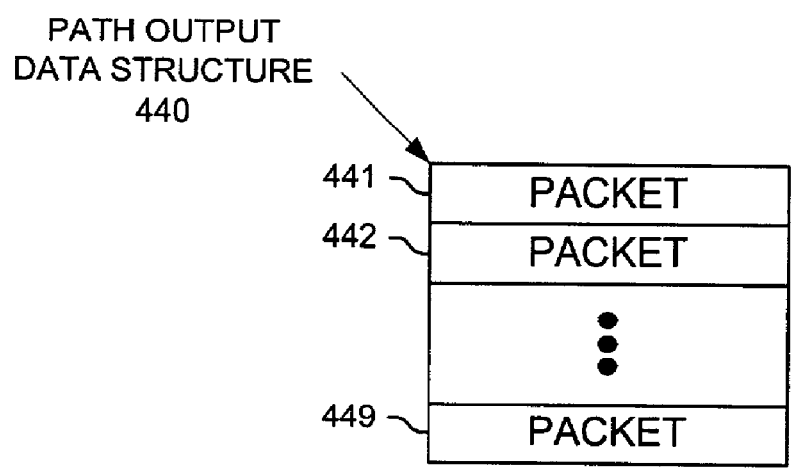

FIG. 2 illustrates a block diagram of one embodiment using a random indication to map items to paths and to recirculate or delay the sending of a particular item when a destination over its mapped path is unreachable, including, but not limited to the context of sending of packets across multiple paths in a packet switching system. In one embodiment, distributor 220 distributes packets over paths 221-229 to destinations 230. As used herein, the term "paths" is used generally to denote an extensible set of routes between two points, and in the context of a packet switching system, these routes may be over the same or different switching planes or fabrics. Moreover, a path may included one or more buffers, transport medium, and/or other components. In one embodiment, a link buffer 218-219 is used for each path 221-229 leading to destination 230. Thus, in which link buffer 218-219 a particular packet is placed, determines, at least at one level (e.g., there may be multiple routes within a path, for example, in one embodiment, a "path" corresponds to a packet switching plane while there are multiple routes between a particular input point and a particular output point in the packet switching plane), which path a particular packet will be sent. In one embodiment, a storage mechanism and/or a data structure, such as path output data structure 440 illustrated in FIG. 4, is used in place of, or in addition to link buffers 218-219. One embodiment of data structure 440 includes an entry 441-449 corresponding to each path 221-229 (FIG. 2) over which an item or packet is to be sent (and most any type of data structure or database could be used to maintain this information.)

As shown in FIG. 2, packets 201 are received into input buffer 211. Control logic 215 extracts packets from input buffer 211, and places them in a particular one of the link buffers 218-219 based on the value of random index 214. One embodiment does not include link buffers 218, rather packets are immediately sent over paths 221-229. In one embodiment, random index 214 is a value, while in one embodiment, random index 214 includes circuitry or another mechanism to receive, store or generate a random indication. Note, the terms "random index" and "random indication" are used herein interchangeably to denote some randomized value or signal. In one embodiment, control logic 215 generates random index 214.

Figure 3:
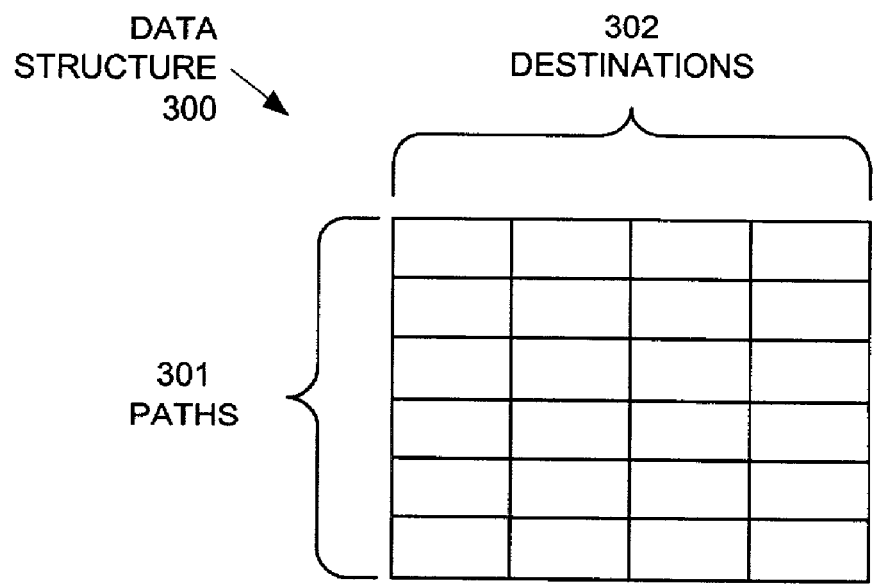
FIGS. 3 and 4 are block diagrams of data structures used in one embodiment.

Storage/status data structure 212 is updated by control logic 215 or by externally generated status updates 213 to reflect the availability of a particular destination over each of the paths 221-229. FIG. 3, to which we now turn, illustrates one embodiment of a data structure 300 used to store this status information. As shown, data structure 300 is a simple bitmap with indices corresponding to paths 301 and destinations 302 (and most any type of data structure or database could be used to maintain this information.) Thus, a lookup operation based on a particular path and particular destination can typically identify whether the destination is reachable over the particular path.

Returning to FIG. 2, distributor 220 typically sends a packet over each path 221-229 each packet time. In one embodiment, control logic 215 identifies a random index to identify a first path 221-229 or link buffer 218-219 of the current packet time, and a packet is mapped to a path 221-229 by being placed in each of the link buffers 218-219 in a predetermined order starting with the identified starting position. In one embodiment, rather that using a single random index 214 and deterministic filling order each packet time, multiple random indices 214 are generated to determine the order in which packets are placed in link buffers 218-219.

Control logic 215 extracts, typically in a sequential order, packets from recirculation buffer 222 and determines whether the extracted packet can be sent over the next path 221-229 to its particular one of the destinations 230. If it can, then the extracted packet is placed in the corresponding link buffer 218-219. Otherwise, the extracted packet is returned to the recirculation buffer 222. After all packets in recirculation buffer 222 have been processed in the current packet time, packets are extracted from input buffer 211 to fill any remaining link buffers 218-219, so a packet will typically be sent over each path 221-229 each packet time. If a packet extracted from input buffer 211 can be sent over the current corresponding path, then it is placed in the corresponding link buffer 218-219, otherwise it is placed in recirculation buffer 222.

Figure 5:
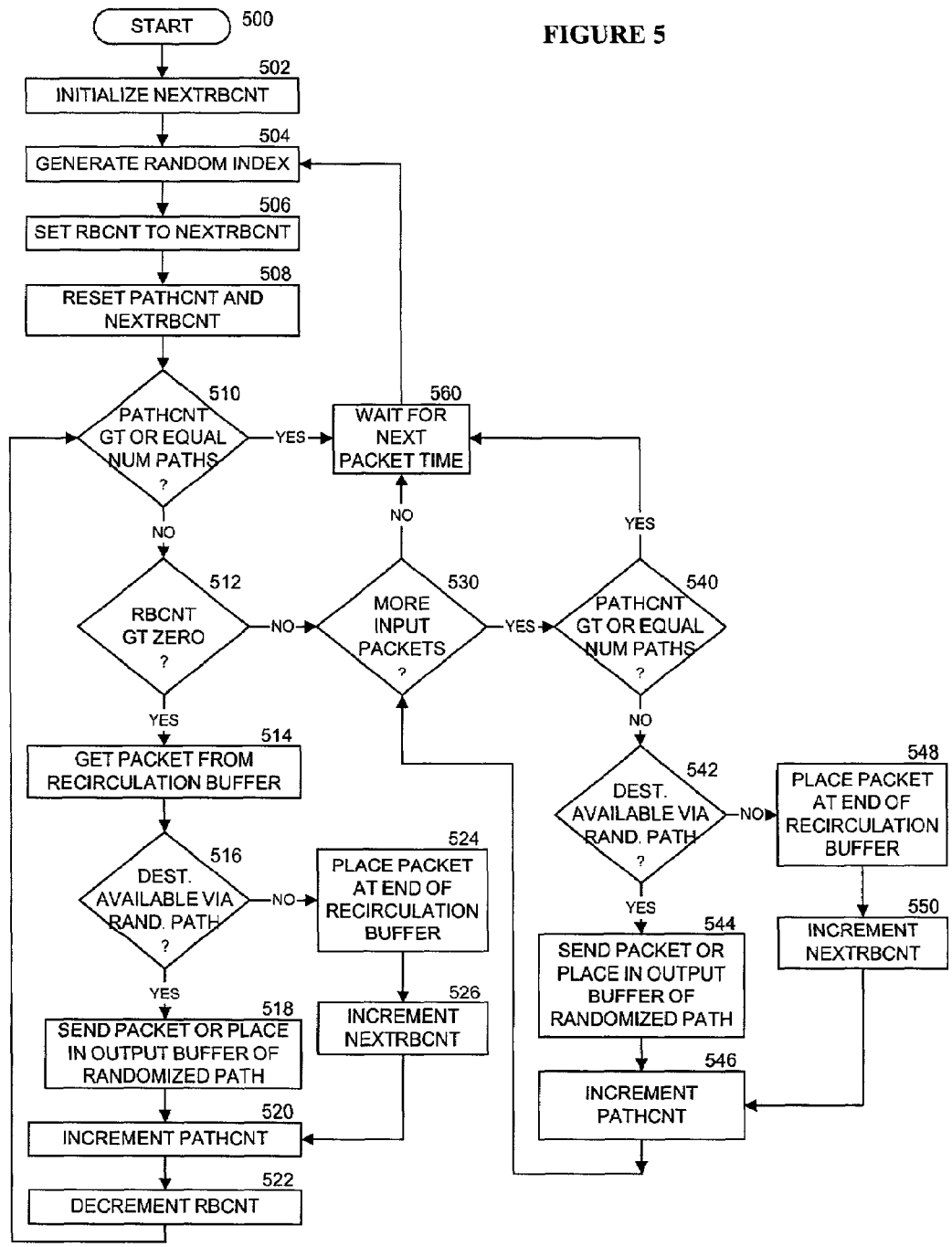
FIG. 5 is a block diagram of a process used in one embodiment using a random indication to map items to paths, and to recirculate or delay the sending of a particular item when a destination over its mapped path is unreachable.

FIG. 5 illustrates a process used in one embodiment using a random indication to map items to paths and to recirculate or delay the sending of a particular item when a destination over its mapped path is unreachable, including, but not limited to the context of sending of packets across multiple paths in a packet switching system. Processing begins with process block 500, and proceeds to process block 502, wherein the variable NEXTRBCNT, identifying the number of entries in the recirculation buffer to be processed in a next packet time, is set to zero. Next, in process block 504, a random index is generated. In process block 506, RBCNT, identifying the number of entries currently in the recirculation buffer, is set to the value of NEXTRBCNT. In process block 508, PATHCNT, identifying the number of paths having a packet to send in the current packet time, and NEXTRBCNT are set to zero. In one embodiment, the path occupancy can be determined based on the value of PATHCNT, while in one embodiment, another mechanism, such as counting the number of paths having or not having a corresponding packet, is used to determine the path occupancy.

If, as determined in process block 510, there are more paths requiring a packet, then as determined in process block 512, if there are entries in the recirculation buffer, then in process blocks 514-526, the packets in the recirculation buffer are processed. In process block 514, a first packet is retrieved from the recirculation buffer. If, as determined in process block 516, the destination of the packet is reachable over the path identified by the output buffer or path occupancy level (e.g., based on the value of PATHCNT) and the random index, then the packet is sent or placed in the path's corresponding output buffer in process block 518. Otherwise, the packet is returned to the end of the recirculation buffer in process block 524, and NEXTRBCNT is incremented in process block 526. Then, in process blocks 520-522, PATHCNT is incremented and RBCNT is decremented. Processing returns to process block 510.

Otherwise, as determined in process block 512, if the recirculation buffer is empty or all items/packets have been processed in the current packet time, then processing proceeds to process blocks 530-550 to fill the remaining paths or output buffers with newly received packets. If, as determined in process block 530, there are more input packets, then, as determined in process block 540, if there are more paths or output buffers to fill, then as determined in process block 542, if the destination of the first packet is reachable over the path identified by the output buffer or path occupancy level (e.g., based on the value of PATHCNT) and the random index, then the packet is sent or placed in the path's corresponding output buffer in process block 544. Otherwise, the packet is placed at the end of the recirculation buffer in process block 548, and NEXTRBCNT is incremented in process block 550. Then, PATHCNT is incremented in process block 546, and processing returns to process block 530.

When processing of the current packet time is complete as determined in process block 530 or 540, processing optionally delays in process block 560 to the next packet time to allow the packets to be physically sent in one embodiment. Processing then returns to process block 504.

Figure 6:
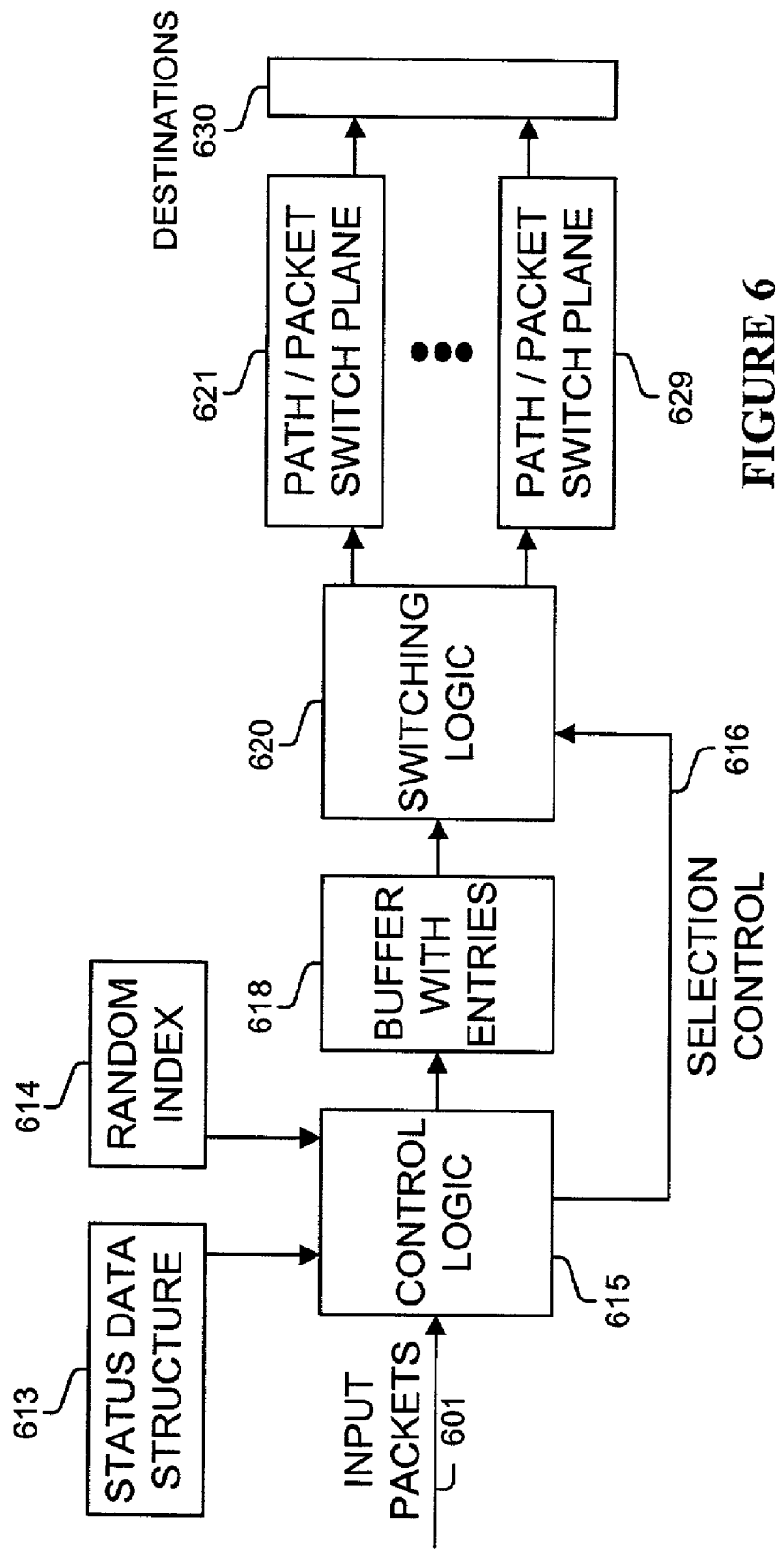
FIG. 6 is a block diagram of a system used in one embodiment using a random indication to map items to paths, and to recirculate or delay the sending of a particular item when a destination over its mapped path is unreachable.

FIG. 6 illustrates a block diagram of one embodiment using a random indication to map items to paths and delay the sending of a particular item when a destination over its mapped path is unreachable, including, but not limited to the context of sending of packets across multiple paths in a packet switching system. In this context, the term recirculate typically means to leave in a buffer, such as buffer with entries 618 which can be referred to as a recirculation buffer.

In one embodiment of the system illustrated in FIG. 6, packets are distributed over paths 621-629 to destinations 630. Packets 601 are received by control logic 615, which fills buffer with entries 618. Based on random index 614, control logic 615 configures, via selection control 616, switching logic 620 to associate a particular entry within buffer with entries 618 to a particular path 621-629. In one embodiment, switching logic 620 includes a physical switching matrix or other connection mechanism. In one embodiment, switching logic 620 uses a round-robin or other distribution technique to map/distribute packets from buffer with entries 618 to paths 621-629 using random index 614 to identify a first or other one of the path 621 (e.g., the random index functions as an offset value.) In on embodiment, multiple random indices 614 are used to map/distribute packets from buffer with entries 618 to paths 621-629. Control logic 615, referencing a status data structure 613, causes packets to be sent from buffer with entries 618 whose particular destination 630 is reachable over the current path configuration of switching logic 620.

Figure 7:
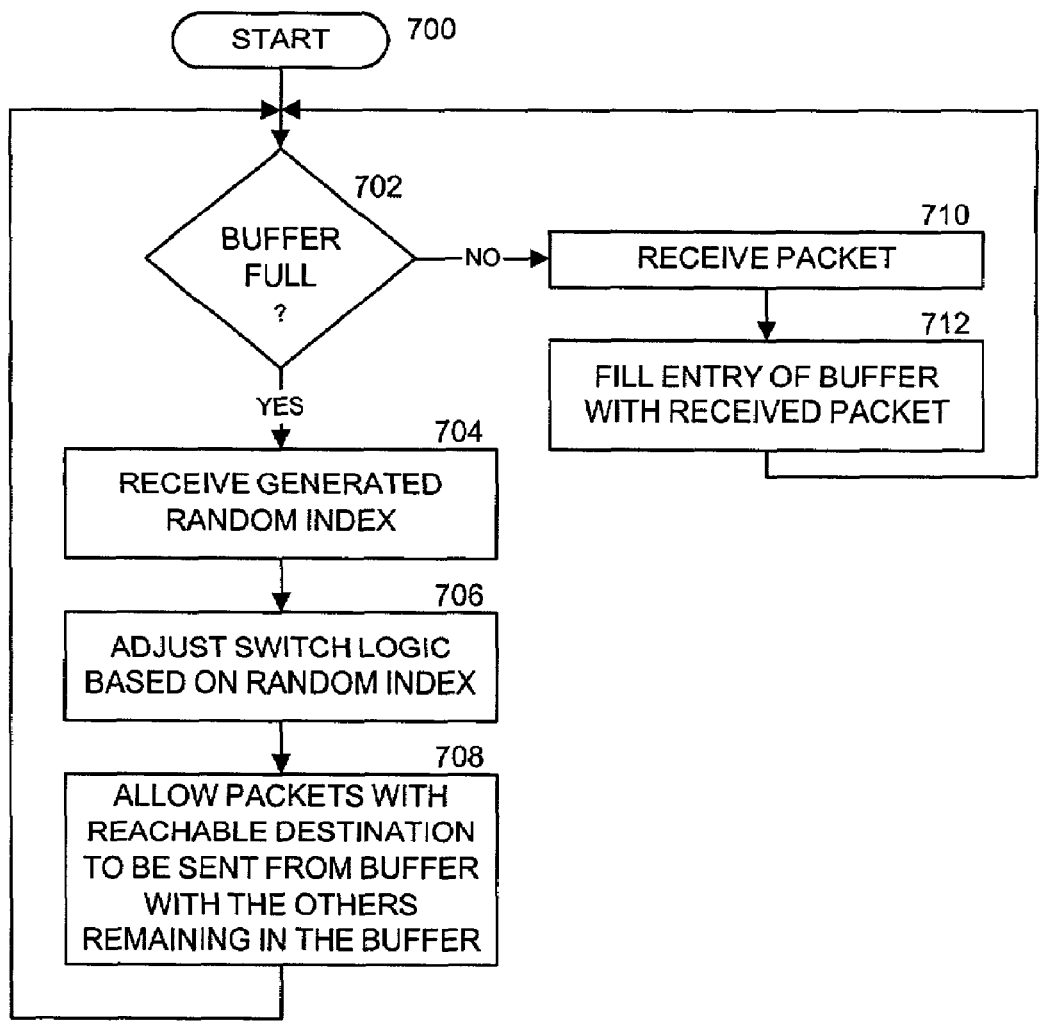
FIG. 7 is a flow diagram of a process used in one embodiment using a random indication to map items to paths, and to delay the sending of a particular item when a destination over its mapped path is unreachable.

FIG. 7 illustrates a process used in one embodiment using a random indication to map items to paths and to recirculate or delay the sending of a particular item when a destination over its mapped path is unreachable, including, but not limited to the context of sending of packets across multiple paths in a packet switching system. Processing begins with process block 700, and proceeds to process block 702. As determined in process block 702, while the buffer is not full, then a packet is received in process block 710, an entry of the buffer is filled with the received packet in process block 712, and processing returns to process block 702. When the buffer is full, processing proceeds to process block 704, wherein a generated random index is received or identified. Next, in process block 706, switch logic is adjusted based on the random index, and in process block 708, packets with a reachable destination are sent from the buffer and the others remain in the buffer or in other terms, are recirculated for the next time. Processing returns to process block 702.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method for mapping packets to paths during a current forwarding cycle in a packet switching device, the method comprising:

generating a random index, the random index identifying a current particular path of a plurality of paths in the packet switching device;

starting at the current particular path identified from the random index, for each particular packet of a plurality of packets stored in a recirculation buffer: (a) in response to determining that said particular packet can be sent over the current particular path based on a path occupancy of the current particular path, causing said particular packet to be sent over the current particular path and advancing the current particular path to a next path of the plurality of paths not already mapped for forwarding a packet during the current forwarding cycle, else (b) in response to determining that said particular packet cannot be sent over the current particular path based on the path occupancy of the current particular path: not advancing the current particular path and wherein the particular packet remains in the recirculation buffer for processing during the next forwarding cycle; and subsequent to the operation of said for each particular packet, while there remains at least one path of the plurality of paths not already mapped for forwarding a packet during the current forwarding cycle and at least one more input packet: identifying a next input packet of said input packets; and if the next input packet can be sent over the current particular path as determined based on a path occupancy of the particular path, then causing said next input packet to be sent over the current particular path and advancing the current particular path to a next path of the plurality of paths not already mapped for forwarding a packet during the current forwarding cycle if any such non-mapped paths remain, else moving said next input packet into the recirculation buffer.

2. The method of claim 1, wherein said forwarding cycle corresponds to a packet time.

3. The method of claim 2, wherein the packet time corresponds to a round of sending one packet over each of the plurality of paths.

4. The method of claim 1, wherein each of the plurality of paths corresponds to a different physical plane of a packet switching system.

5. The method of claim 1, wherein the plurality of paths does not include all of the planes of a packet switching system.

6. The method of claim 1, wherein the plurality of paths includes all of the planes of a packet switching system.

7. The method of claim 1, wherein if said particular packet is not determined that it can be sent over the current particular path, said particular packet is moved to the end of the recirculation buffer.

8. One or more computer-readable media tangibly embodying computer-executable instructions for performing operations for mapping packets to paths during a current forwarding cycle in a packet switching device, said operations comprising:

generating a random index, the random index identifying a current particular path of a plurality of paths in the packet switching device;

starting at the current particular path identified from the random index, for each particular packet of a plurality of packets stored in a recirculation buffer: in response to determining that said particular packet can be sent over the current particular path based on a path occupancy of the current particular path, causing said particular packet to be sent over the current particular path and advancing the current particular path to a next path of the plurality of paths not already mapped for forwarding a packet during the current forwarding cycle, else (b) in response to determining that said particular packet cannot be sent over the current particular path based on the path occupancy of the current particular path: not advancing the current particular path and wherein the particular packet remains in the recirculation buffer for processing during the next forwarding cycle; and subsequent to the operation of said for each particular packet, while there remains at least one path of the plurality of paths not already mapped for forwarding a packet during the current forwarding cycle and at least one more input packet: identifying a next input packet of said input packets; and if the next input packet can be sent over the current particular path as determined based on a path occupancy of the particular path, then causing said next input packet to be sent over the current particular path and advancing the current particular path to a next path of the plurality of paths not already mapped for forwarding a packet during the current forwarding cycle if any such non-mapped paths remain, else moving said next input packet into the recirculation buffer.

9. The computer-readable media of claim 8, wherein said operations include moving said particular packet to the end of the recirculation buffer if said particular packet is not determined that it can be sent over the current particular path.

10. An apparatus for mapping packets to paths during a current forwarding cycle in a packet switching device, the apparatus comprising:

means for generating a random index, the random index identifying a current particular path of a plurality of paths in the packet switching device;

means for, starting at the current particular path identified from the random index, processing each particular packet of a plurality of packets stored in a recirculation buffer, said processing including: in response to determining that said particular packet can be sent over the current particular path based on a path occupancy of the current particular path, causing said particular packet to be sent over the current particular path and advancing the current particular path to a next path of the plurality of paths not already mapped for forwarding a packet during the current forwarding cycle, else (b) in response to determining that said particular packet cannot be sent over the current particular path based on the path occupancy of the current particular path: not advancing the current particular path and wherein the particular packet remains in the recirculation buffer for processing during the next forwarding cycle; and means for assigning packets to remaining unused paths subsequent to said processing each particular packet, said operation of assigning including: while there remains a path of the plurality of paths not already mapped for forwarding a packet during the current forwarding cycle and at least one more input packet: (a) identifying a next input packet of said input packets; and (b) if the next input packet can be sent over the current particular path as determined based on a path occupancy of the particular path, then causing said next input packet to be sent over the current particular path and advancing the current particular path to a next path of the plurality of paths not already mapped for forwarding a packet during the current forwarding cycle if any such non-mapped paths remain, else moving said next input packet into the recirculation buffer.

11. An apparatus for mapping packets to paths during a current forwarding cycle in a packet switching device, the apparatus comprising: a plurality of paths; a recirculation buffer; and control logic;

wherein the control logic is configured to:

acquire a random index, the random index identifying a current particular path of the plurality of paths in the packet switching device;

starting at the current particular path identified from the random index, for each particular packet of a plurality of packets stored in the recirculation buffer: in response to determining that said particular packet can be sent over the current particular path based on a path occupancy of the current particular path, causing said particular packet to be sent over the current particular path and advancing the current particular path to a next path of the plurality of paths not already mapped for forwarding a packet during the current forwarding cycle, else (b) in response to determining that said particular packet cannot be sent over the current particular path based on the path occupancy of the current particular path: not advancing the current particular path and wherein the particular packet remains in the recirculation buffer for processing during the next forwarding cycle; and subsequent to the operation of said for each particular packet, while there remains at least one path of the plurality of paths not already mapped for forwarding a packet during the current forwarding cycle and at least one more input packet: identifying a next input packet of said input packets; and if the next input packet can be sent over the current particular path as determined based on a path occupancy of the particular path, then causing said next input packet to be sent over the current particular path and advancing the current particular path to a next path of the plurality of paths not already mapped for forwarding a packet during the current forwarding cycle if any such non-mapped paths remain, else moving said next input packet into the recirculation buffer.

12. The apparatus of claim 11, wherein said forwarding cycle corresponds to a packet time.

13. The apparatus of claim 12, wherein the packet time corresponds to a round of sending one packet over each of the plurality of paths.

14. The apparatus of claim 11, comprising a plurality of physical planes through the packet switching device; wherein each of the plurality of paths corresponds to a different physical plane of the plurality of physical planes.

15. The apparatus of claim 11, comprising a plurality of physical planes through the packet switching device; wherein the plurality of paths does not include all of the planes of the plurality of physical planes.

16. The apparatus of claim 11, comprising a plurality of physical planes through the packet switching device; wherein the plurality of paths includes all of the plurality of physical planes.

17. The apparatus of claim 11, wherein if said particular packet is not determined that it can be sent over the current particular path, said particular packet is moved to the end of the recirculation buffer.

* * * * *

UNITED STATES PATENT AND TRADEMARK OFFICE
CERTIFICATE OF CORRECTION

PATENT NO. : 7,613,200 B1  Page 1 of 1
APPLICATION NO. : 10/051728
DATED : November 3, 2009
INVENTOR(S) : Williams, Jr. et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2163 days.

Signed and Sealed this

Nineteenth Day of October, 2010

David J. Kappos
*Director of the United States Patent and Trademark Office*